United States Patent [19]
Abe

[11] Patent Number: 5,770,927
[45] Date of Patent: Jun. 23, 1998

[54] METHOD AND APPARATUS FOR DISTINGUISHING CONTROL CHANNEL FROM TRAFFIC CHANNELS

[75] Inventor: Masami Abe, Tokyo, Japan

[73] Assignee: Oki Electric Industry Co., Ltd., Tokyo, Japan

[21] Appl. No.: 689,501

[22] Filed: Aug. 7, 1996

[30] Foreign Application Priority Data

Aug. 23, 1995 [JP] Japan .................................. 7-214580

[51] Int. Cl.⁶ .................................................. H04L 27/06
[52] U.S. Cl. ........................................................ 375/340
[58] Field of Search .................................... 375/340, 260, 375/259; 390/337, 329; 455/450–455, 434, 422

[56] References Cited

U.S. PATENT DOCUMENTS 5,199,031  3/1993  Dahlin .................................... 370/329
5,606,548  2/1997  Vayrynen et al. ...................... 370/347

Primary Examiner—Tesfaldet Bocure
Attorney, Agent, or Firm—Spencer & Frank

[57] ABSTRACT

A discriminating circuit stores a flag designating a received radio signal as belonging to a traffic channel, a control channel, or an unidentified channel. If the flag does not indicate the traffic channel, the discriminating circuit decodes the signal and detects errors on the assumption that the signal belongs to the control channel. The detected errors include convolutional code errors, which are detected by re-encoding the decoded signal, as well as errors in other types of codes. If the flag indicates that the channel is unidentified, a counter is incremented according to the paucity or absence of errors. When the counter reaches a threshold value, the flag is set to indicate the control channel.

18 Claims, 10 Drawing Sheets

FIG. 3

|      | F-BCCH | E-BCCH | S-BCCH | Reserved | SPACH |
|------|--------|--------|--------|----------|-------|
| DVCC | 0      | ASSIGNED VALUE ||||
| CRC  | INVERTED |||| NORMAL |
| SFP  | 0      | . . . . . . . . . . . . . . . . . . . . . . . . . . . |||| 1F |

METHOD AND APPARATUS FOR DISTINGUISHING CONTROL CHANNEL FROM TRAFFIC CHANNELS

BACKGROUND OF THE INVENTION

The present invention relates to a method and apparatus enabling a mobile communication device to distinguish a control channel from a traffic channel in, for example, the North American time-division multiple-access (TDMA) cellular system.

As described in recommendations IS-54B and IS-136 of the Telecommunications Industry Association, the North American TDMA cellular system divides the frequency spectrum allocated for down-links from a base station to mobile stations into the same thirty-kilohertz (30-kHz) frequency channels as used by the analog Advanced Mobile Phone System. These channels carry both control signals and telephone traffic. The following types of channels may therefore coexist in the same cell: analog control channels (ACC), digital control channels (DCCH), analog voice channels (AVC), and digital traffic channels (DTC), the total number of channels numbering over one thousand.

In originating or receiving a call, a mobile station must first access a control channel (ACC or DCCH) in order to receive a voice channel assignment (for analog communication) or a traffic channel and time-slot assignment (for digital communication). An analog control channel (ACC) has a fixed frequency and can be accessed easily, but the digital control channels (DCCH) have no fixed frequency assignments. Instead, there are only certain frequency areas in which a DCCH is more or less likely to be present. The mobile station must therefore search these areas in order of likelihood, scanning the channels in each area until a DCCH is recognized. As there are many possible locations for the DCCH, each location must be checked as quickly as possible. The key to shortening the search time is to be able to distinguish quickly between DCCH and DTC time slots.

Different coding schemes are employed for DCCH and DTC data. A basic difference is that DTC data are interleaved over different time slots, while DCCH data are interleaved only within the same time slot. Another difference concerns the way in which cyclic redundancy check (CRC) bits are calculated.

One method of identifying a DCCH slot is thus to decode the data by the DCCH scheme and check whether the CRC value is correct. This method is slow because it works in only some of the DCCH time slots, in which the CRC computation does not depend on information that the mobile station has not yet received.

A second method is to decode the data by the DTC scheme and check whether the CRC value is correct. Here the problem is the slot interleaving of the DTC data. Not only is it necessary to wait for two time slots before the data can be de-interleaved and decoding can begin; it is also necessary to provide extra memory space to store the data for the second time slot. This method is thus slow, and costly in terms of memory usage.

The DCCH and DTC data are accompanied by auxiliary information (described later), to which Hamming codes are attached for error detection and correction. Here too, there are differences between the DCCH and DTC coding schemes, involving the positions of the encoded bits and inversion or non-inversion of the Hamming code. A third method of DTC/DCCH discrimination is thus available: the auxiliary information can be decoded and the presence of errors checked. Unfortunately, the Hamming codes do not reliably detect errors in more than two bits, so for accurate DTC/DCCH discrimination, the auxiliary data must be checked over a series of several time slots. This third method of discrimination is thus slow, or inaccurate.

SUMMARY OF THE INVENTION

It is accordingly an object of the present invention to speed up the process of discriminating between traffic and control channels in a received signal.

Another object of the invention is to confirm the accuracy of control-channel identification.

A further object is to reduce memory requirements for discrimination between traffic and control channels.

The invented apparatus and method discriminate between a traffic channel carrying coded traffic data and a coded control-channel locator value, and a control channel carrying convolutionally coded control data and a coded super-frame phase value. The invented method comprises the steps of:

checking a flag designating a received channel as a traffic channel, a control channel, or an unidentified channel;

decoding the coded locator value, if the flag designates the channel as a traffic channel, to obtain information for locating the control channel;

decoding and detecting errors in the coded control data and coded super-frame phase value, if the flag does not designate the channel as a traffic channel;

incrementing a counter responsive to paucity or absence of these errors, if the flag indicates that the channel is still unidentified; and setting the flag to indicate that the channel is a control channel, when the counter reaches a threshold value.

The invented method preferably also comprises some or all of the following further steps:

convolutionally re-encoding the decoded control data, and comparing the coded control data and re-encoded control data to determine whether the above-mentioned paucity of errors exists;

incrementing the above counter when the coded super-frame phase value is decoded to an expected value;

confirming the identification of the channel as a control channel, by checking whether the coded super-frame phase value is decoded to the expected value;

decoding and detecting errors in the coded locator value, if the flag designates that the channel is still unidentified and the threshold value has not yet been reached; and setting the flag to designate the channel as a traffic channel, responsive to absence of errors in the coded locator value.

The invented apparatus comprises digital circuit means for carrying out the steps above.

BRIEF DESCRIPTION OF THE DRAWINGS

In the accompanying drawings:

FIG. 3 illustrates the DCCH data sequence and coding rules in a super-frame;

DETAILED DESCRIPTION OF THE PREFERRED EMBODIMENTS

Embodiments of the invention will now be described with reference to the attached illustrative drawings.

In the North American TDMA cellular system, a digital data stream is divided into forty-millisecond (40-ms) frames comprising six time slots each. A time slot may be either a DTC slot or a DCCH slot. At a frequency in which a DCCH is present, the first time slot in each frame is always a DCCH slot. One or more of the other time slots in the frame may also be DCCH slots.

The frames are organized into super-frames comprising sixteen frames each. DCCH information can be transmitted at a full rate or half rate. At the full rate, each digital control channel (DCCH) is assigned two time slots per frame, hence thirty-two time slots per super-frame. At the half rate, there is only one DCCH time slot per frame, hence sixteen DCCH time slots per super-frame. The full and half rates are distinguished by different synchronization patterns.

Figure 1:
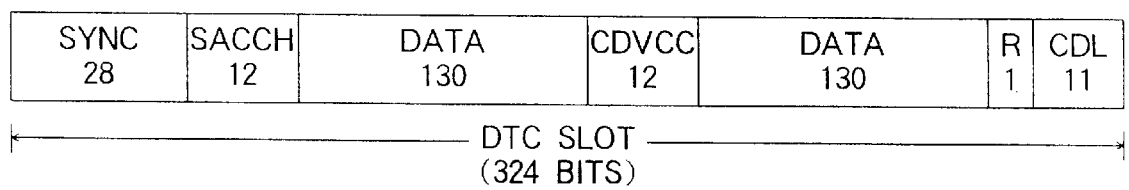
FIG. 1 illustrates the structure of a DTC time slot.
Figure 2:
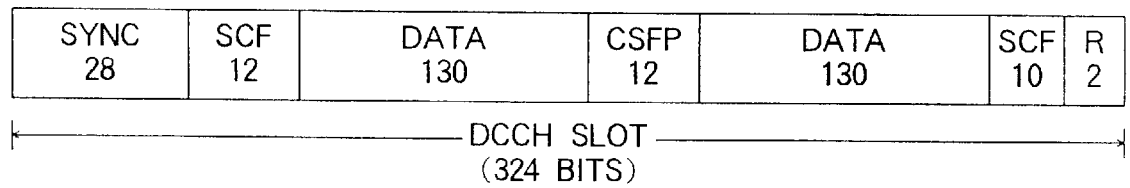
FIG. 2 illustrates the structure of a DCCH time slot.

FIGS. 1 and 2 illustrate the structure of DTC and DCCH time slots, the numbers beneath each item representing the bit length of the item. Each slot comprises in total three hundred twenty-four bits, of which two-hundred sixty bits are data bits, and the first twenty-eight bits are a synchronization pattern (SYNC). In addition, a DTC slot has a twelve-bit slow associated control channel (SACCH), a twelve-bit coded digital verification color code (CDVCC), an eleven-bit coded DCCH locator (CDL), and one reserved bit (R), whereas a DCCH slot has twenty-two bits of shared control feedback (SCF) information, a twelve-bit coded super-frame phase (CSFP) value, and two reserved bits (R).

The digital verification color code (DVCC) is an eight-bit non-zero value assigned by the base station to the mobile station, and is the same in each DTC slot addressed to the mobile station. The coded digital verification color code (CDVCC) comprises the DVCC and a four-bit Hamming code.

The DCCH locator (DCCL) is a seven-bit value designating the approximate location of a DCCH frequency. The coded DCCH locator (CDL) is generated by treating the DCCL as an eight-bit value with the most significant bit fixed at zero, calculating a four-bit Hamming code, and inverting the four calculated Hamming bit values. The same CDL value is transmitted in each DTC time slot.

The twenty-two SCF bits comprise an eleven-bit coded partial echo (CPE) interleaved with a five-bit reserved/not-reserved (R/N) code and a six-bit busy/reserve/idle (BRI) code. The eleven-bit CPE value is generated from a seven-bit partial echo value by attaching a four-bit inverted Hamming code, in the same way that the CDL is generated from the DCCL.

The super-frame phase (SFP) value is an eight-bit value that cycles from zero to thirty-one in increments of one (for full-rate DCCH transmission) or two (for half-rate transmission). The coded SFP value (CSFP) is obtained by attaching a four-bit inverted Hamming code.

DTC and DCCH data are both encoded by a concatenated code comprising a block code with CRC bits, and a convolutional code with a constraint length of six branches.

The DTC data may comprise voice data, or a fast associated control channel (FACCH). Voice data are block-encoded with seven CRC bits, then convolutionally encoded with a code rate of one-half. FACCH data are block-encoded with sixteen CRC bits, then convolutionally encoded with a code rate of one-fourth. For FACCH data, the DVCC value is included in the CRC computation.

The DCCH data in each DCCH slot comprise a fast broadcast channel (F-BCCH), an extended broadcast channel (E-BCCH), a short message service broadcast channel (S-BCCH), a short message service channel (SMSCH), a paging channel (PCH), or an access response channel (ARCH). These last three channels are referred to collectively as an SMSCH, PCH, and ARCH channel, or SPACH. In each case the data are block-encoded with sixteen CRC bits, the DVCC value being included in the CRC computation. For an F-BCCH block, however, the DVCC value is regarded as zero. The CRC bits are inverted, except for an SPACH block. After block encoding, the data are convolutionally encoded with a code rate of one-half.

Referring to FIG. 3, different types of DCCH data may appear in the sixteen or thirty-two DCCH slots in a super-frame. F-BCCH, E-BCCH, S-BCCH, and SPACH slots appear in the order indicated at the top of FIG. 3, with reserved slots inserted as necessary between the S-BCCH and SPACH slots. The number of slots of each type varies, however, and is unknown to the mobile station until the mobile station has received, decoded, and analyzed at least one slot of F-BCCH data. The DVCC value is similarly unknown until the F-BCCH data have been analyzed. When searching for a DCCH slot, the mobile station only knows that the CRC value in the first slot of a DCCH super-frame (which is always an F-BCCH slot) will have been computed using a DVCC value of zero and will have been inverted. For other slots, the CRC value is uncertain. For that reason, the present invention does not rely primarily on CRC values in discriminating between DCCH and DTC slots.

Incidentally, FIG. 3 illustrates a sequence of thirty-two slots identified by SFP values from zero to thirty-one (shown as hexadecimal 1F).

In searching for a digital control channel, the mobile station selects the most likely frequency and attempts to detect the synchronization pattern (SYNC) in FIGS. 1 and 2. If no synchronization pattern can be detected, this frequency is assumed to belong to an analog channel, and the mobile station proceeds to search at the next-most-likely frequency. This process continues until a synchronization pattern is detected at some frequency. Detection of the synchronization pattern enables the mobile station to determine whether the full rate or half rate is in use. The mobile station then begins scanning the first time slot in each frame at this frequency (for the half rate), or the first and fourth time slots (for the full rate), and deciding whether each slot is a DTC or a DCCH slot.

The invented DTC/DCCH discrimination method will be described with reference to the flowcharts in FIGS. 4 to 8. The meanings of the flags and other variables appearing in these flowcharts are summarized in Table 1. The initial values of NDCCH, NDTC, NOT_SYNC, and SYNC_DCCH are zero.

TABLE 1

| | |
|---|---|
| CRC_DCCH | 1: Error detected by DCCH data CRC code |
| | 0: No error detected |
| ERDCCL | 1: Error detected by DCCL Hamming code |
| | 0: No error detected |
| ERDVCC | 1: Error detected by DVCC Hamming code |
| | 0: No error detected |
| ERSCF | 1: Error detected by SCF Hamming code |
| | 0: No error detected |
| ERSFP | 1: Error detected by SFP Hamming code |
| | 0: No error detected |
| FHALF | 1: Half rate |
| | 0: Full rate |
| NDCCH | DCCH likelihood count |
| NDTC | DTC likelihood count |
| NOT_SYNC | Not-synchronized likelihood count |
| NSFP | Super-frame phase count; expected SFP value |
| recvdSFP | Received SFP value |
| REENC_DCCH | Number of bit discrepancies between received DCCH data and re-encoded DCCH data |
| SYNC_DCCH | 1: DCCH slot |
| | −1: DTC slot |
| | 0: Unidentified slot |

Figure 4:
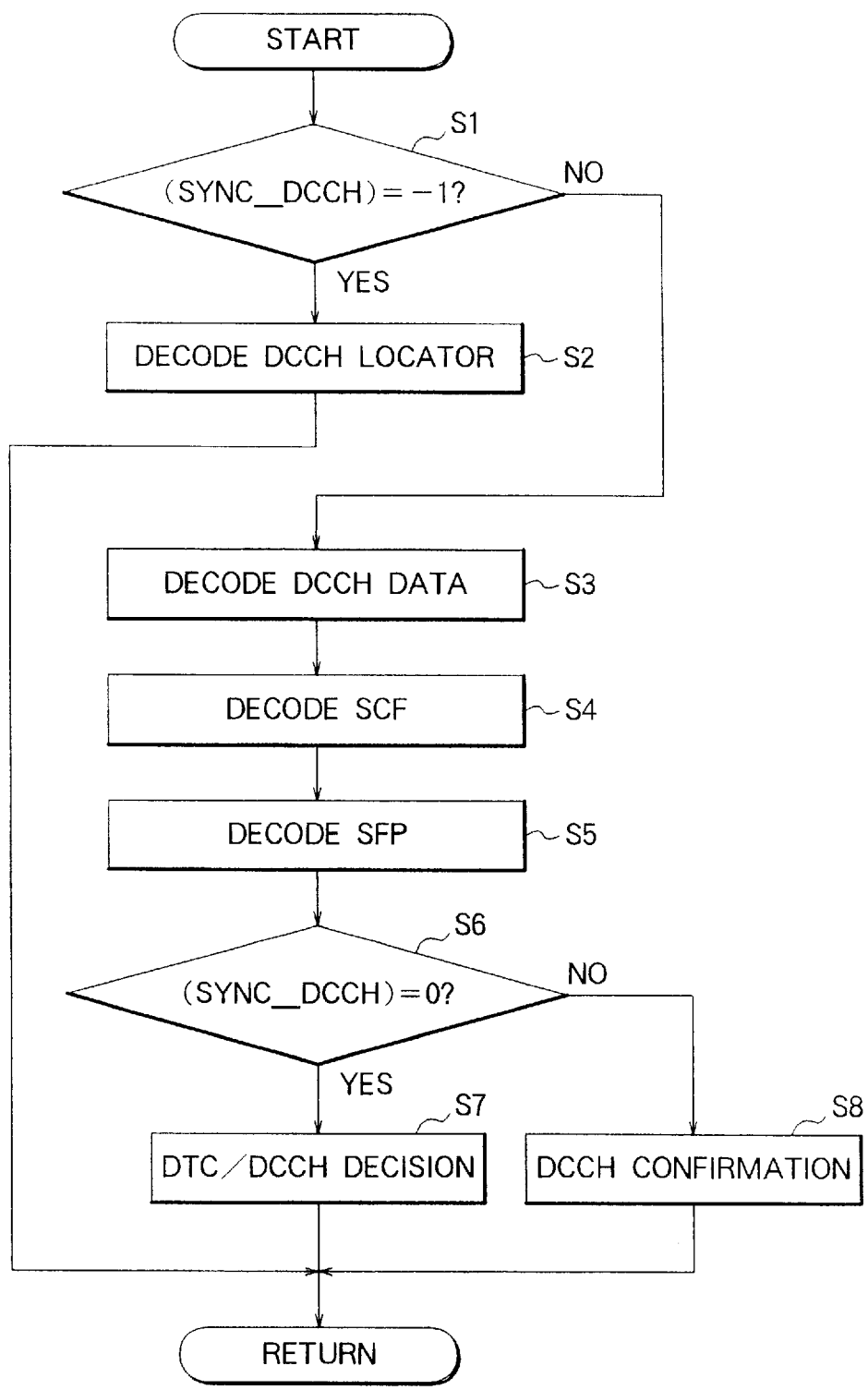
FIG. 4 is a general flowchart of the invented DTC/DCCH discrimination method.

FIG. 4 illustrates the general flow of the discrimination process.

First the SYNC_DCCH flag is checked (step S1). If this flag is set to minus one, indicating that the current slot has already been identified as a DTC slot, the DCCH locator (DCCL) is decoded (step 2). If the SYNC_DCCH flag is not set to minus one, the slot is considered a candidate DCCH slot, and the DCCH data, SCF, and SFP are decoded (steps S3, S4, and S5).

In the first embodiment described below, the SCF information is not used for control/traffic channel discrimination, so step S4 can be omitted.

The process now branches depending on whether the SYNC_DCCH flag value is zero or one (step S6). If the SYNC_DCCH flag is set to zero, indicating that the slot is still unidentified, an attempt is made to decide whether the slot is a DTC or DCCH slot (step S7). If the SYNC_DCCH flag is set to one, indicating that the slot has already been identified as a DCCH slot, an attempt is made to confirm this decision (step S8).

Figure 5:
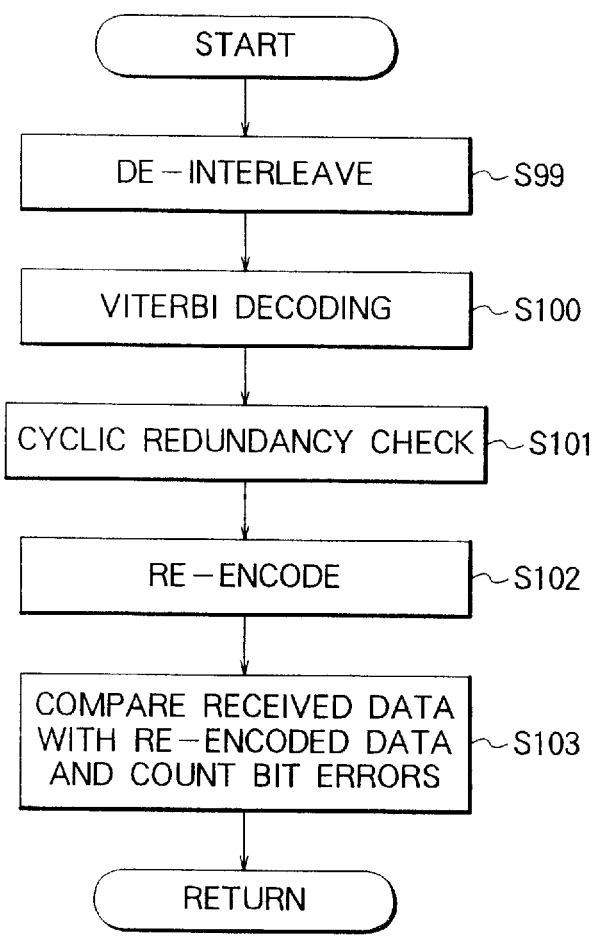
FIG. 5 is a more detailed flowchart of the DCCH data decoding step in FIG. 4, according to a first embodiment of the invention.

FIG. 5 illustrates the DCCH data decoding process.

First the data in one slot are de-interleaved (step S99). The de-interleaved data are then convolutionally decoded by the Viterbi algorithm, a well-known maximum-likelihood method (step S100).

The CRC bits in the decoded data are then checked by repeating the CRC calculation (step S101). If the type of DCCH data is not known, the slot is assumed to contain F-BCCH data, the CRC calculation is performed with a DVCC value of zero, and the CRC bits are inverted. If the decoded CRC bits are found to match the re-calculated CRC value, the CRC_DCCH flag is cleared to zero; otherwise the CRC_DCCH flag is set to one.

Next, the decoded data are re-encoded by the same convolutional code, with a constraint length of six branches and code rate of one-half (step S102). The re-encoded data are compared with the received data, the number of bit discrepancies (bit errors) is counted, and this number is assigned to the variable REENC_DCCH (step S103).

Similarly, when the SFP value is decoded (step S5 in FIG. 4), the ERSFP flag is set to one if an error is detected by the SFP Hamming code, and cleared to zero if no error is detected. In the second embodiment described below, when the SCF value is decoded (step S4), the ERSCF flag is set to one if an error is detected by the SCF Hamming code, and cleared to zero if no error is detected.

Next, the DTC/DCCH decision process (step S7 in FIG. 4) according to the first embodiment of the invention will be described with reference to FIGS. 6 and 7.

Figure 6:
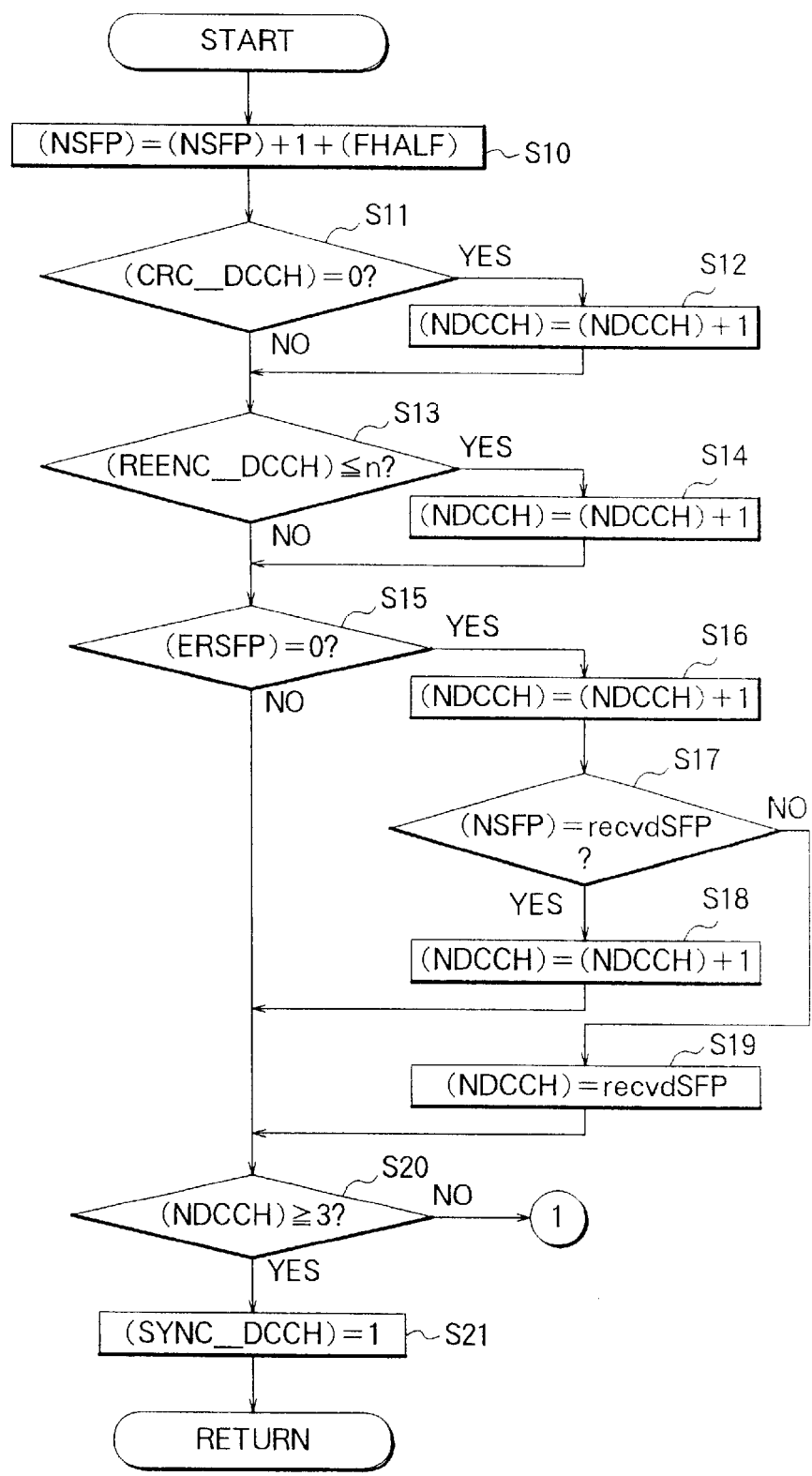
FIG. 6 is a more detailed flowchart of the DTC/DCCH decision step in the first embodiment.

Referring to FIG. 6, first, the super-frame phase count (NSFP) is incremented by one (full rate) or two (half rate) by the following assignment operation (step S10):

$(NSFP)=(NSFP)+1+(FHALF)$

Next, the CRC_DCCH flag is tested (step S11). If this flag is cleared to zero, indicating that the CRC value was correct, the DCCH likelihood count (NDCCH) is incremented by one (step S12).

Next, the number of bit discrepancies between the received and re-encoded DCCH data (REENC_DCCH) is compared with a certain first threshold value n (step S13). If the number of bit discrepancies does not exceed n, the DCCH likelihood count (NDCCH) is incremented by one (step S14).

Next, the ERSFP flag is tested (step S15). If this flag is cleared to zero, indicating that no errors were detected by the SFP Hamming code, the DCCH likelihood count (NDCCH) is incremented by one (step S16), and the received SFP value (recvdSFP) is compared with the super-frame phase count (NSFP) (step S17). If the NSFP value equals the received SFP value, indicating that the SFP value was as expected, the DCCH likelihood count (NDCCH) is again incremented by one (step S18); otherwise, the NSFP value is discarded as incorrect and replaced by the received SFP value (step S19).

Next, the DCCH likelihood count (NDCCH) is tested (step S20). If NDCCH is equal to or greater than a certain second threshold value (e.g. three), the current slot is assumed to be a DCCH slot and the SYNC_DCCH flag is set to one (step S21).

Figure 7:
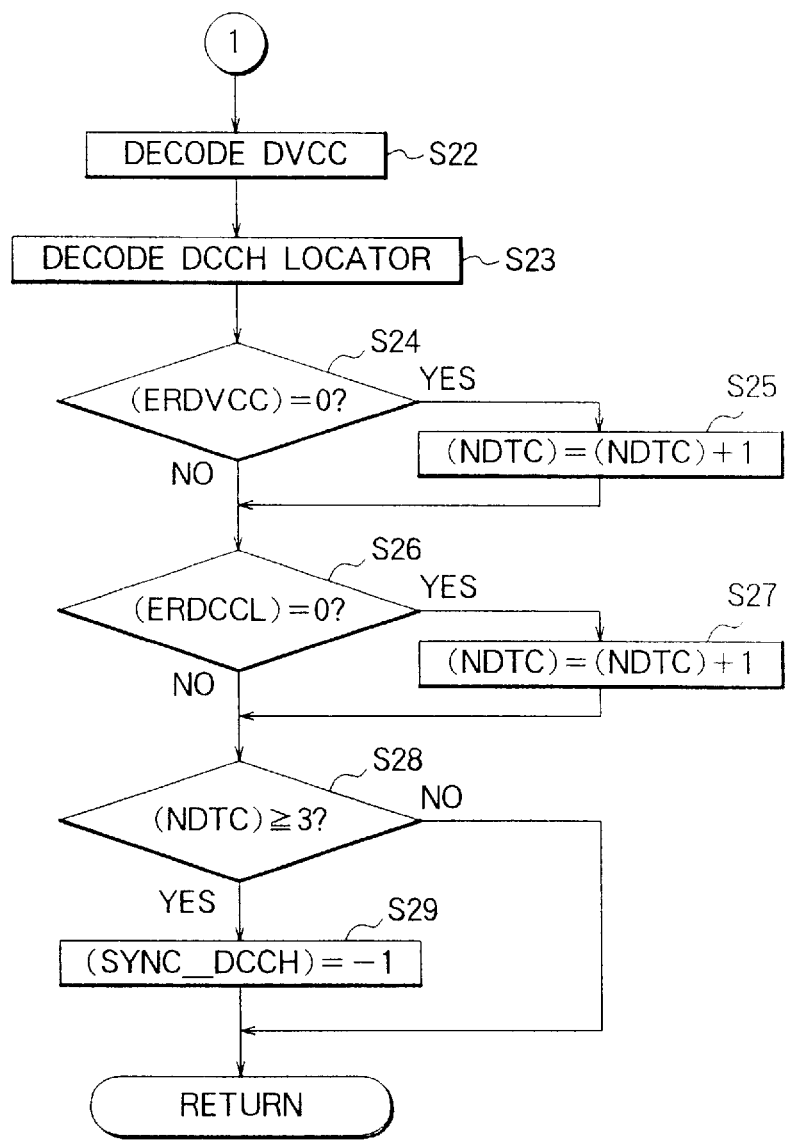
FIG. 7 is a continuation of the flowchart in FIG. 6.

Referring to FIG. 7, if the DCCH likelihood count (NDCCH) is less than the second threshold value (three), the digital verification color code (DVCC) and DCCH locator (DCCL) are decoded on the temporary assumption that the slot is a DTC slot (steps S22 and S23). If an error is detected by the DVCC Hamming code, the ERDVCC flag is set to one. If an error is detected by the DCCL Hamming code, the ERDCCL flag is set to one. ERDVCC and ERDCCL are cleared to zero when errors are not detected.

Next, the ERDVCC flag is tested (step S24). If this flag is cleared to zero, indicating that no errors were detected by the DVCC Hamming code, the DTC likelihood count (NDTC) is incremented by one (step S25).

Similarly, the ERDCCL flag is tested (step S26). If this flag is cleared to zero, indicating that no errors were detected by the DCCL Hamming code, the DTC likelihood count (NDTC) is incremented by one (step S27).

Next, the DTC likelihood count (NDTC) is tested (step S28). If NDTC is equal to or greater than a certain third threshold value (e.g. three), the current slot is assumed to be a DTC slot and the SYNC_DCCH flag is set to minus one (step S29).

The DTC/DCCH decision process accordingly sets the SYNC_DCCH flag to one when the DCCH likelihood count reaches the second threshold value, sets the SYNC_DCCH flag to minus one when the DTC likelihood count reaches the third threshold value, and leaves the SYNC_DCCH flag cleared to zero when neither count has reached the necessary threshold value.

Next the DCCH confirmation process will be described. This process is carried out when the SYNC_DCCH flag has already been set to one.

Figure 8:
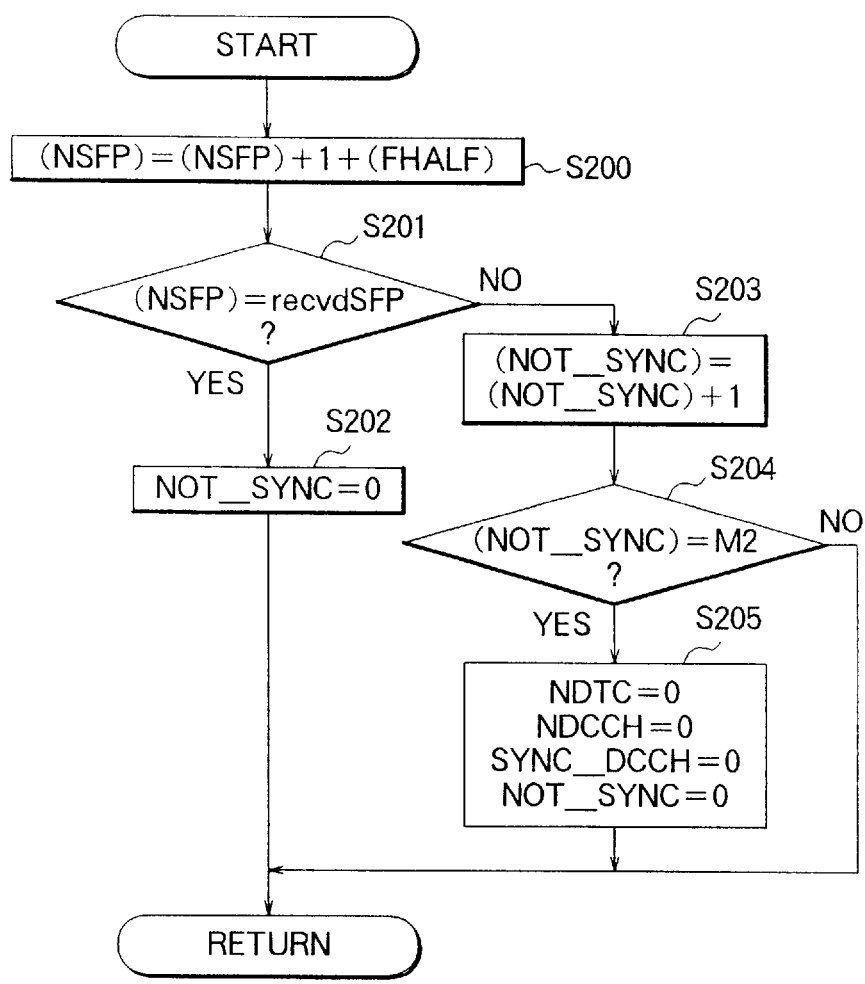
FIG. 8 is a more detailed flowchart of the DCCH confirmation step in the first embodiment.

Referring to FIG. 8, this process also starts by incrementing the super-frame phase count (NSFP) by one or two, depending on whether the full or half rate is employed (step S200). The NSFP value is then compared with the received SFP value (step S201). If the NSFP value and received SFP value are equal, the not-synchronized likelihood count (NOT_SYNC) is cleared to zero (step S202).

If the NSFP value and received SFP value are not equal, the not-synchronized likelihood count (NOT_SYNC) is incremented by one (step S203), then compared with a fourth threshold value M2 (step S204). If NOT_SYNC has reached this threshold value M2, then the identification of the slot as a DCCH slot is considered to have been incorrect. The three likelihood counts (NDTC, NDCCH, and NOT_SYNC) are all cleared to zero, the SYNC_DCCH flag is cleared to zero, and the discrimination process for this slot starts over from the beginning (step S205).

The DTC/DCCH discrimination process illustrated in FIGS. 4 to 7 is carried out until the time slot or slots being scanned have been identified as DCCH or DTC slots; that is, until the SYNC_DCCH flag is set to plus or minus one. When a DTC time slot is identified, step S2 in FIG. 4 is carried out, and the mobile station switches to the frequency indicated by the DCCH locator. When a DCCH time slot is identified, the process illustrated in FIGS. 4, 5, and 8 continues in subsequent frames in order to decode the DCCH data and confirm the DCCH identification.

The above DTC/DCCH discrimination method is quick because it uses information obtained from a variety of conditions. For DCCH identification, these conditions are (1) no CRC errors, (2) few convolutional code errors, (3) no SFP Hamming code errors, and (4) reception of the expected SFP value. For DCCH time slots containing F-BCCH data, conditions (1), (2), and (3) will usually be satisfied even if the super-frame phase is unknown. If the threshold value tested in step S20 is three, as shown in FIG. 6, a correct DCCH identification can be made from a single time slot.

For DCCH time slots containing other types of DCCH data, conditions (2) and (3) will usually lead to correct DCCH identification within two time slots, with no need to store the data of the first time slot while waiting for the second time slot. In the second time slot, the fourth condition (4) will normally also be satisfied.

A correct DTC identification can also usually be made in two time slots, by the process shown in FIG. 7. The probability that a DTC time slot will be incorrectly identified as a DCCH time slot before being correctly identified as a DTC time slot is thus extremely small, and if such a wrong identification occurs, it will quickly be remedied by the confirmation process in FIG. 8. The first embodiment is thus both fast and accurate.

Figure 9:
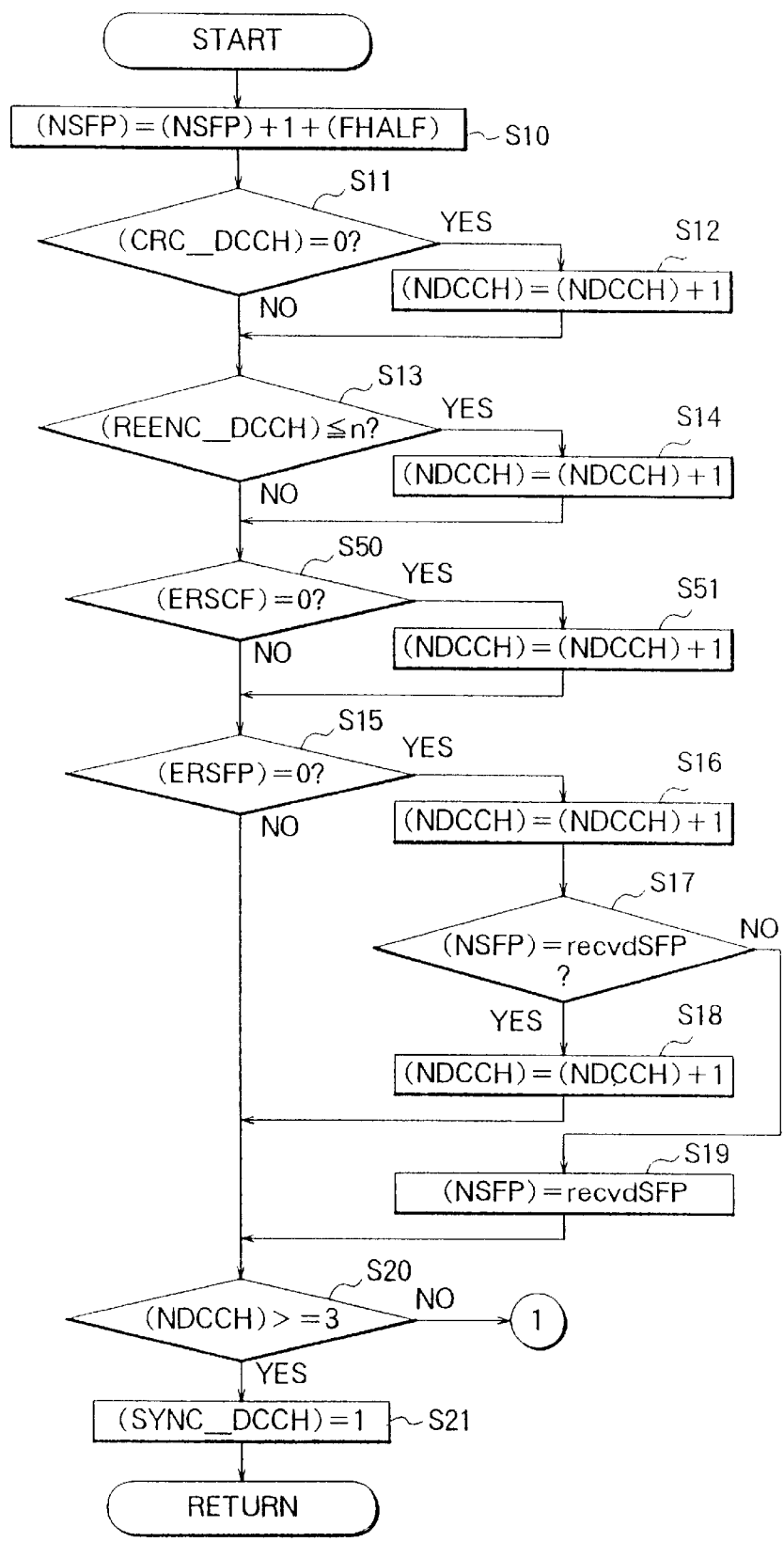
FIG. 9 is a more detailed flowchart of the DTC/DCCH decision step in a second embodiment.

The second embodiment is illustrated in FIG. 9, which corresponds to FIG. 6 of the first embodiment, and uses the same reference numerals for the same steps. The only difference from FIG. 6 is the insertion of two new steps that test the ERSCF flag (step S50), and increment the DCCH likelihood count (NDCCH) if no errors were detected by the SCF Hamming code. Apart from this difference, the second embodiment operates like the first embodiment, so a detailed description will be omitted.

In the second embodiment, the DCCH likelihood count (NDCCH) can reach the necessary threshold value (three) in a single time slot, even if the time slot does not contain F-BCCH data, provided the number of convolutional code errors is small and no errors are detected by the SCF and SFP Hamming codes. The second embodiment thus permits even faster identification of DCCH slots than in the first embodiment.

Descriptions of apparatus in which the invented DTC/DCCH discrimination method can be practiced will be given next.

Figure 10:
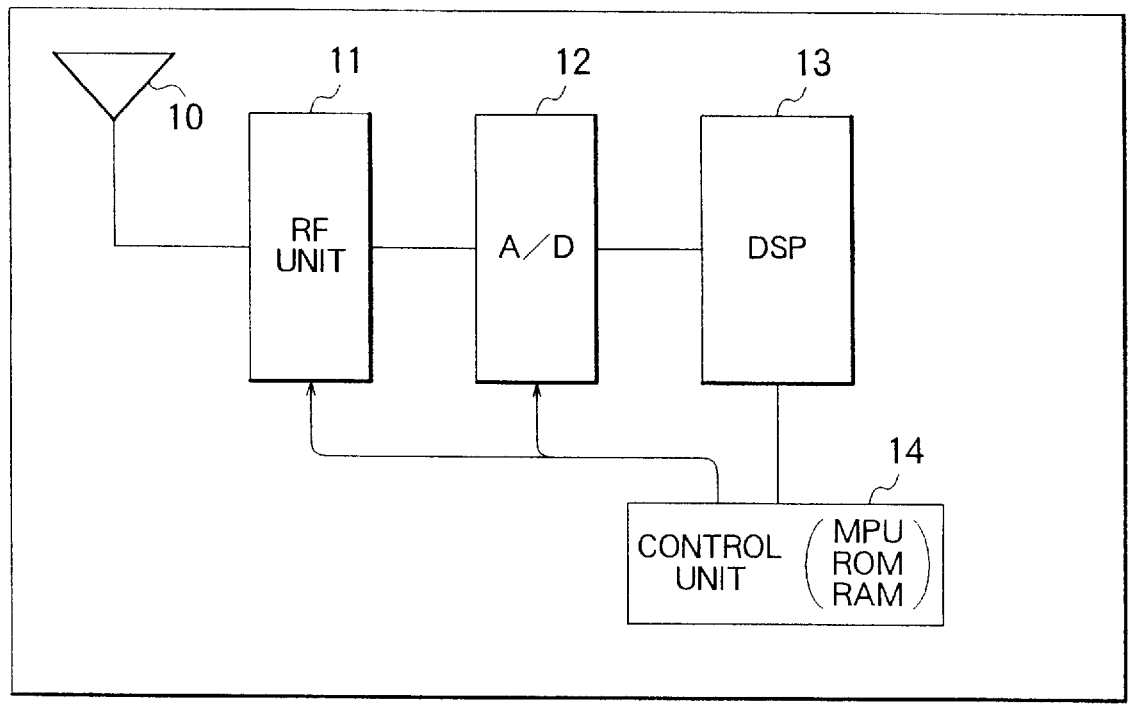
FIG. 10 is a block diagram of apparatus employed at a mobile station.

FIG. 10 is a block diagram showing the hardware configuration of a mobile station apparatus such as a portable cellular telephone set. The apparatus has an antenna 10 for receiving a radio-frequency signal from a base station, a radio-frequency (RF) receiving unit 11 for demodulating the radio-frequency signal to a baseband-frequency signal, an analog-to-digital (A/D) converter 12 for converting the baseband-frequency signal to a digital signal, a digital signal processor (DSP) 13 for processing this digital signal, and a control unit 14 for controlling the RF unit 11, A/D converter 12, and DSP 13. The control unit 14 comprises, for example, a microprocessor unit (MPU), read-only memory (ROM), and random-access memory (RAM).

The invented DTC/DCCH discrimination method can be practiced in this configuration by suitable programming of the DSP 13 and control unit 14. The control unit 14, for example, can be programmed to check the SYNC_DCCH flag in steps Sl and S6 in FIG. 4, and control the DSP 13 according to the flag value. The DSP 13 can be programmed to carry out the other steps in FIGS. 4 to 9 at high speed. The control unit 14 should also be programmed to command the RF unit 11 to switch frequencies according to the DCCH locator value, after a DTC time slot has been identified.

Figure 11:
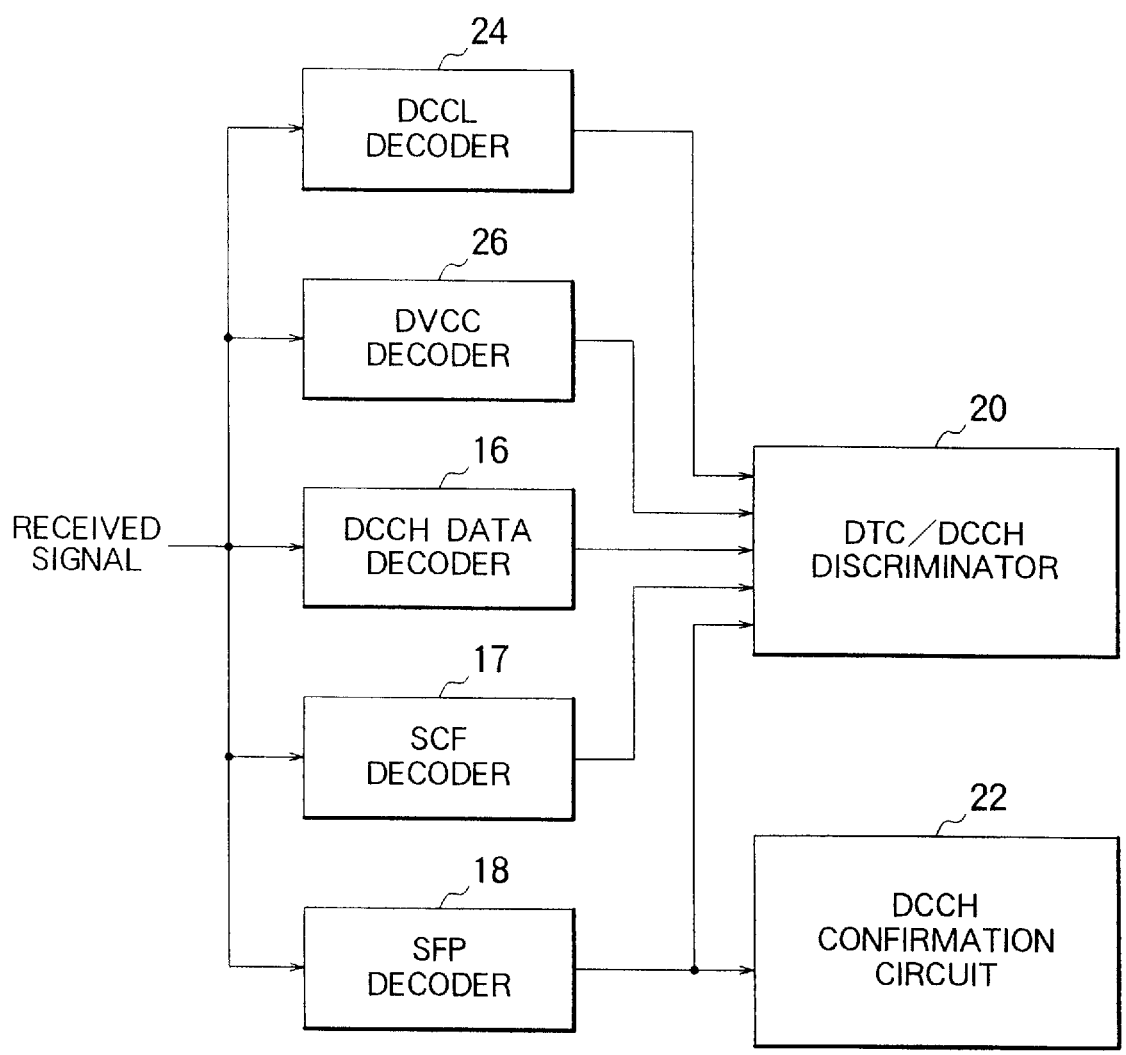
FIG. 11 is a block diagram of a circuit for performing DTC/DCCH discrimination and DCCH confirmation according to the invention.

Alternatively, specialized hardware circuits for practicing the invented DTC/DCCH discrimination method can be provided in a hardware accelerator built into the DSP 13, or in a separate device such as a gate-array device. Referring to FIG. 11, these hardware circuits will in general comprise a DCCH data decoder 16, an SCF decoder 17, an SFP decoder 18, a DTC/DCCH discriminator 20, a DCCH confirmation circuit 22, a DCCL decoder 24, and a DVCC decoder 26.

The DCCH data decoder 16 has a memory for storing received data, a de-interleaver, a Viterbi decoder, a CRC checker, a convolutional encoder, and a comparator for comparing the received data with the data re-encoded by the convolutional coder. These facilities carry out the steps shown in FIG. 5.

The SCF, SFP, DCCL, and DVCC decoders 17, 18, 24, and 26 comprise de-interleaving circuits and Hamming decoders.

The DTC/DCCH discriminator 20 has an incrementing circuit for incrementing the NDCCH and NDTC values according to the conditions shown in FIGS. 6 and 7, or FIGS. 9 and 7, and a flag-setting circuit for setting SYNC_DCCH to plus or minus one.

The DCCH confirmation circuit 22 has a comparator for checking whether the NSFP value matches the received SFP value, an incrementer for incrementing NOT_SYNC if these values do not match, and a resetting circuit for resetting NDCCH, NDTC, NOT_SYNC, and SYNC_DCCH to zero when NOT_SYNC reaches a threshold value (M2), as shown in FIG. 8.

Techniques for creating circuits such as the above in gate-array logic are well known, so a more detailed hardware description will be omitted.

Although the embodiments described above are designed for use in the North American TDMA system, with slight modifications the invention can be adapted to discriminate between control and traffic channels in other TDMA systems, such as the Japanese digital cellular (PDC) system.

More generally, the invention can be adapted to discriminate between any two bit streams when the two bit streams are encoded by different convolutional codes, or when only one of them is convolutionally coded.

The invention has been described as incrementing counters, but may of course be adapted to add any fixed values to the counter values. For example, a fixed value of minus one can be added, thereby decrementing the counters.

Those skilled in the art will recognize that further modifications and variations are possible within the scope of the invention as claimed below.

What is claimed is:

1. A discriminating circuit for deciding whether a received radio signal belongs to a traffic channel carrying coded traffic data and a coded control-channel locator value, or to a control channel carrying convolutionally coded control data and a coded super-frame phase value, comprising:

a first decoding means for decoding, and detecting errors in, said coded locator value;

a second decoding means for decoding, and detecting errors in, said convolutionally coded control data;

a third decoding means for decoding, and detecting errors in, said coded super-frame phase value; and a discrimination means for designating said received signal as belonging to said traffic channel, responsive to a number of errors detected by said first decoding means, and for designating said received signal as belonging to said control channel, responsive to numbers of errors detected by said second decoding means and said third decoding means.

2. The discriminating circuit of claim 1, also comprising a confirmation means for determining whether said coded super-frame phase value was decoded to an expected value, thereby confirming whether said received signal belongs to said control channel, after said discrimination means has designated said received signal as belonging to said control channel.

3. The discriminating circuit of claim 1, wherein said second decoding means detects errors by re-encoding said control data to obtain re-encoded control data, and comparing said convolutionally coded control data with said re-encoded control data.

4. The discriminating circuit of claim 3, wherein said second decoding means also detects errors by performing a cyclic redundancy check after decoding said convolutionally coded control data.

5. The discriminating circuit of claim 1, wherein said control channel also carries coded control feedback information, further comprising a fourth decoding means for decoding, and detecting errors in, said coded control feedback information, absence of errors in said coded control feedback information being taken into account by said discrimination means in designating said received signal as belonging to said control channel.

6. A method of deciding whether a received radio signal belongs to a traffic channel carrying coded traffic data and a coded control-channel locator value, or to a control channel carrying coded control data and a coded super-frame phase value, comprising the steps of:

storing a flag having a first value designating said traffic channel, a second value designating said control channel, and a third value designating an unidentified channel;

checking said flag to determine the value thereof;

decoding said coded locator value, if said flag has said first value;

decoding, and detecting errors in, said coded control data and said coded super-frame phase value, if said flag does not have said first value;

modifying a counter responsive to numbers of said errors, if said flag has said third value;

comparing said counter with a threshold value; and setting said flag to said second value when said counter reaches said threshold value.

7. The method of claim 6, wherein said coded control data are coded by a concatenated code comprising a block code and a convolutional code, then interleaved, and said step of decoding, and detecting errors, comprises the further steps of:

de-interleaving said coded control data;

convolutionally decoding said coded control data by a maximum-likelihood method to obtain decoded control data;

detecting block-code errors by calculating a check value in said decoded control data;

re-encoding said decoded control data by means of said convolutional code, thereby generating re-encoded control data; and comparing said coded control data with said re-encoded control data, thereby detecting convolutional-code errors in said coded control data.

8. The method of claim 6, comprising the further steps of:

decoding, and detecting errors in, said coded locator value, if said flag has said third value and said counter has not reached said threshold; and setting said flag to said first value, responsive to absence of errors in said coded locator value.

9. The method of claim 6, comprising the further step of changing said flag from said second value to said third value, if said coded super-frame phase value is decoded to an unexpected value a certain number of times.

10. The method of claim 6, wherein said control channel also carries coded control feedback information, comprising the further steps of:

decoding, and detecting errors in, said coded control feedback information; and modifying said counter, responsive to absence of errors in said coded control feedback information.

11. A method of deciding whether a received radio signal belongs to a traffic channel carrying coded traffic data and a coded locator value, or to a control channel carrying convolutionally coded control data and a coded super-frame phase value, comprising the steps of:

storing a flag having a first value designating said traffic channel, a second value designating said control channel, and a third value designating an unidentified channel;

checking said flag to determine the value thereof;

decoding, and detecting errors in, said coded super-frame phase value, if said flag does not have said first value, thereby obtaining a decoded super-frame phase value;

adding a first fixed value to a first counter if no errors were detected in said coded super-frame phase value;

decoding said convolutionally coded control data, if said flag does not have said first value, thereby obtaining decoded control data;

re-encoding said decoded control data, thereby obtaining re-encoded control data;

comparing said convolutionally coded control data with said re-encoded control data;

adding said first fixed value to said first counter if there are not more than a predetermined number of discrepancies between said convolutionally coded control data and said re-encoded control data;

comparing said first counter with a first threshold value, if said flag has said third value;

setting said flag to said second value if said first counter has reached said first threshold value;

decoding, and detecting errors in, said coded locator value, if said first counter has not reached said first threshold value;

adding a second fixed value to a second counter if no errors were detected in said coded locator value; and setting said flag to said first value, if said second counter has reached a second threshold value.

12. The method of claim 11, wherein said decoded control data comprise check bits, comprising the further steps of:

re-calculating said check bits from said decoded control data; and adding said first fixed value to said first counter if there are no errors in said check bits.

13. The method of claim 12, wherein said check bits are cyclic redundancy check bits.

14. The method of claim 11, comprising the further steps of:

incrementing an expected super-frame phase value, if said flag has said third value;

comparing said expected super-frame phase value with said decoded super-frame phase value, if said flag has said third value and no errors were detected in said coded super-frame phase value; and adding said first fixed value to said first counter, if said flag has said third value, no errors were detected in said coded super-frame phase value, and said expected super-frame phase value matches said decoded super-frame phase value.

15. The method of claim 14, comprising the further step of:

setting said expected super-frame phase value to said decoded super-frame phase value, if said flag has said third value, no errors were detected in said coded super-frame phase value, and said expected super-frame phase value does not match said decoded super-frame phase value.

16. The method of claim 11, comprising the further steps of:

incrementing an expected super-frame phase value, if said flag has said second value;

comparing said expected super-frame phase value with said decoded super-frame phase value, if said flag has said second value;

clearing a third counter, if said flag has said second value and said expected super-frame phase value matches said decoded super-frame phase value;

adding a third fixed value to said third counter, if said flag has said second value and said expected super-frame phase value does not match said decoded super-frame phase value;

comparing said third counter with a third threshold value; and changing said flag from said second value to said third value, if said third counter has reached said third threshold value.

17. The method of claim 11, wherein said traffic channel also carries a coded verification code, comprising the further steps of:

decoding, and detecting errors in, said coded verification code, if said first counter has not reached said first threshold value; and adding said second fixed value to said second counter if no errors were detected in said coded verification code.

18. The method of claim 11, wherein said control channel also carries coded control feedback information, comprising the further steps of:

decoding, and detecting errors in, said coded control feedback information; and adding said first fixed value to said first counter if there are no errors in said coded control feedback information.

* * * * *